US012654340B2

(12) United States Patent
Swope et al.

(10) Patent No.: US 12,654,340 B2
(45) Date of Patent: Jun. 16, 2026

(54) SHAPE-MEMORY EFFECTOR ASSEMBLIES

(71) Applicant: ZEBRA TECHNOLOGIES CORPORATION, Lincolnshire, IL (US)

(72) Inventors: Charles Burton Swope, Coral Springs, FL (US); Matthew B. Hayes, Wheaton, IL (US); Robert E. Beach, Los Altos, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 881 days.

(21) Appl. No.: 17/990,477

(22) Filed: Nov. 18, 2022

(65) Prior Publication Data

US 2024/0165832 A1 May 23, 2024

(51) Int. Cl.
B25J 18/02 (2006.01)
F03G 7/06 (2006.01)
B25J 17/02 (2006.01)

(52) U.S. Cl.
CPC .......... B25J 18/025 (2013.01); F03G 7/0614 (2021.08); B25J 17/0275 (2013.01)

(58) Field of Classification Search
CPC ... B25J 9/0009; B25J 9/10; B25J 9/104; B25J 9/1045; B25J 9/1085; B25J 9/12; B25J 9/1602; B25J 9/1664; B25J 17/0266; B25J 17/0275; B25J 18/00; B25J 18/005; B25J 18/007; B25J 18/02; B25J 18/025; B25J 18/04; B25J 18/06; F03G 7/06; F03G 7/061; F03G 7/06114; F03G 7/0612; F03G 7/0613; F03G 7/0614; F03G 7/0143; F03G 7/06145; F03G 7/06146; F03G 7/0615

USPC ......................................................... 294/213
See application file for complete search history.

(56) References Cited

U.S. PATENT DOCUMENTS

| | | | | |
|---|---|---|---|---|
| 4,841,730 A * | 6/1989 | McDonald | .......... | F03G 7/06146 |
| | | | | 60/527 |
| 5,570,920 A * | 11/1996 | Crisman | .................. | B25J 9/104 |
| | | | | 294/111 |
| 8,641,115 B2 * | 2/2014 | Kim | ........................ | B25J 15/083 |
| | | | | 294/111 |

(Continued)

FOREIGN PATENT DOCUMENTS

| | | | | |
|---|---|---|---|---|
| CN | 108500970 A * | 9/2018 | .............. | B25J 9/104 |
| CN | 115609571 A * | 1/2023 | ................ | B25J 9/04 |

(Continued)

*Primary Examiner* — Joshua E Rodden

(57) ABSTRACT

An effector assembly includes: a segment defining a conduit between proximal and distal ends and containing a slidable output member; a first shape-memory transducer affixed between the proximal end and the output member; a second shape-memory transducer affixed between the distal end and the output member; an electrical subassembly to selectively supply current to bias the first transducer to a first memory state and bias the second transducer to a second deformed state, for sliding the output member in a first direction, or bias the second transducer to a second memory state and bias the first transducer to a first deformed state, for sliding the output member in a second direction; a second segment movably coupled to the distal end; and a linkage between the output member and the second segment, to move the second segment relative to the segment in response to sliding of the output member.

15 Claims, 5 Drawing Sheets

(56) References Cited

U.S. PATENT DOCUMENTS

| | | | | |
|---|---|---|---|---|
| 9,545,727 | B1 * | 1/2017 | Shamlian | ............... B25J 9/1045 |
| 11,433,534 | B2 * | 9/2022 | Simkins | ................... B25J 9/126 |
| 2020/0130174 | A1 * | 4/2020 | Kawanami | ............. F16H 21/16 |
| 2024/0165793 | A1 * | 5/2024 | Swope | ................... B25J 9/0009 |
| 2024/0165797 | A1 * | 5/2024 | Swope | ................... B25J 9/0009 |
| 2024/0165832 | A1 * | 5/2024 | Swope | ................... B25J 9/1085 |

FOREIGN PATENT DOCUMENTS

| | | | | |
|---|---|---|---|---|
| EP | 3208051 | A2 * | 8/2017 | ............... B25J 9/04 |
| JP | 60050280 | A * | 3/1985 | |
| JP | 60219973 | A * | 11/1985 | |

* cited by examiner

SHAPE-MEMORY EFFECTOR ASSEMBLIES

BACKGROUND

Various object-handling operations, such as removing objects from shelves or other support structures, can be mechanized and/or automated, e.g., with robotic arms or the like. Mechanization of such operations can include deploying effector assemblies including various actuators including linear solenoids and the like. In some applications, however, the use of actuators such as solenoids can result in complex and bulky effectors.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
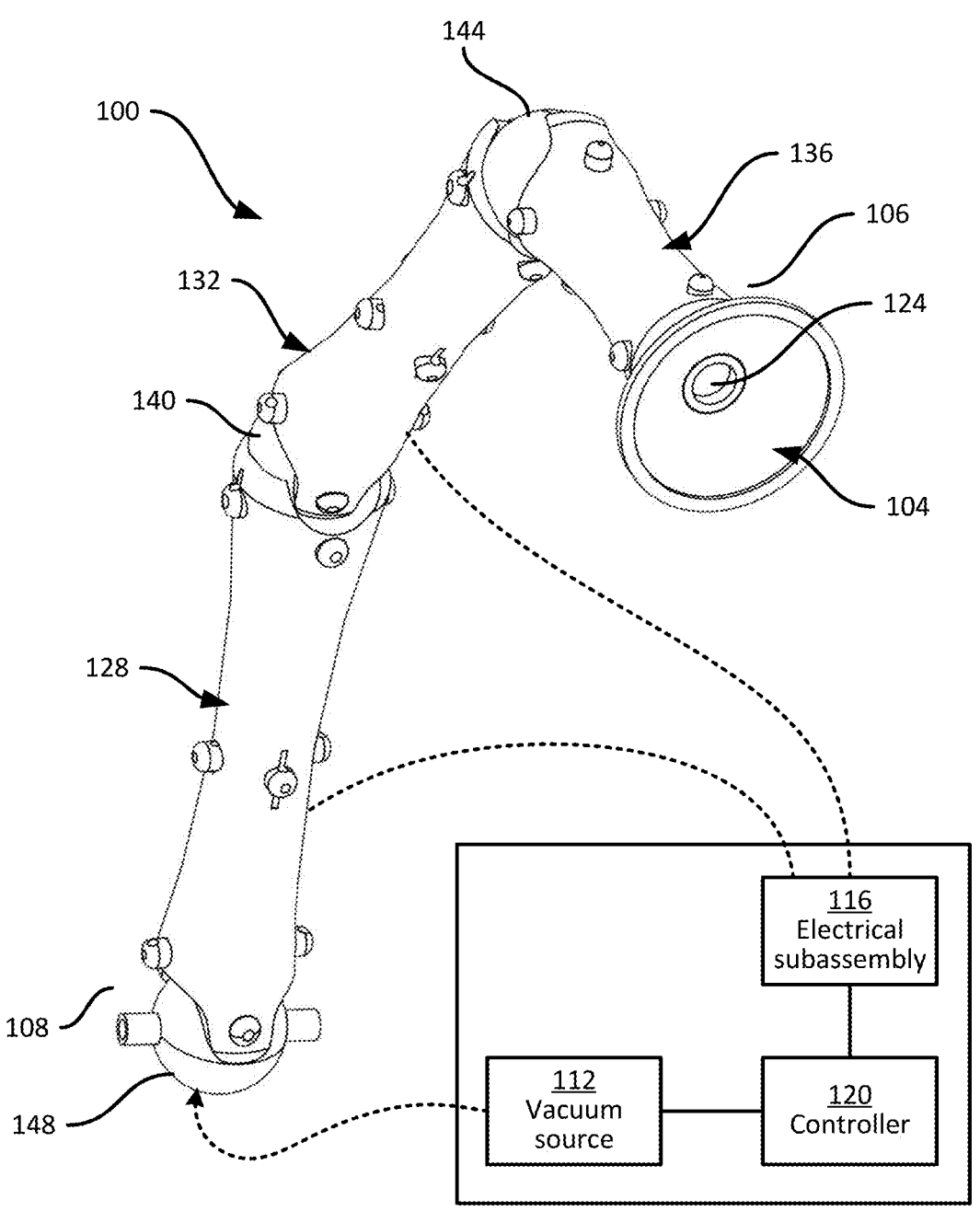
FIG. 1 is a diagram of an effector assembly.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to an effector assembly, comprising: a first segment defining a first conduit between (i) a first proximal end having an inlet, and (ii) a first distal end having an outlet; an output member slidable within the conduit; a first shape-memory transducer affixed between the first proximal end and the output member; a second shape-memory transducer affixed between the first distal end and the output member; an electrical subassembly configured to selectively supply current to (i) bias the first shape-memory transducer to a first memory state and bias the second shape-memory transducer to a second deformed state, for sliding the output member in a first direction, or (ii) bias the second shape-memory transducer to a second memory state and bias the first shape-memory transducer to a first deformed state, for sliding the output member in a second direction; a second segment movably coupled to the first distal end; and a linkage between the output member and the second segment, the linkage configured to move the second segment relative to the first segment in response to sliding of the output member.

FIG. 1 illustrates an effector assembly 100, e.g., for manipulating objects such as packages or other items on support structures such as shelves. The effector assembly 100 is configured to engage with an object via an effector output such as a suction cup 104 at a distal end 106 of the effector assembly 100, opposite a proximal end 108 of the assembly 100. The proximal end 108 can be affixed to a base or other mounting structure, which can also support further components of the assembly 100 including, but not limited to, a vacuum source 112 (e.g., a pump or the like), an electrical subassembly 116, and a controller 120 (e.g., a field-programmable gate array (FPGA) or the like). The controller 120 is configured to enable and disable the vacuum source 112, to apply a vacuum at a distal effector outlet 124 defined by the suction cup 104. Application of the vacuum at the outlet 124 facilitates engagement between the suction cup 104 and an object such as a parcel or the like on a support structure.

The controller 120 is also configured to control the electrical subassembly 116 to apply electrical signals to various portions of the assembly 100, as discussed below, to articulate and/or move the assembly 100, e.g., to pull the object engaged by the suction cup 104 from a support structure and into a bin or other receptacle for transport.

The assembly 100 includes a plurality of segments, including at least a first segment 128 and a second segment 132. In the illustrated example, the assembly 100 also includes a third segment 136 carrying the suction cup 104. In other examples, the assembly 100 can include additional segments. The segments 128, 132, and 136 are articulated, such that the segment 136 can move relative to the segment 132, and the segment 132 can move relative to the segment 128. In some examples, the segment 128 can also move relative to the base mentioned earlier. Relative movement between adjacent segments is facilitated by respective joints 140 and 144. In some examples, a further joint 148 at the proximal end 108 can permit the segment 128 to move relative to the base.

Movement of the segments 128, 132, and 136 relative to one another is effected by shape-memory transducers disposed within at least the first segment 128 and the second segment 132. The shape-memory transducers are activated by the electrical subassembly 116. Under the control of the controller 120, the electrical subassembly 116 can selectively open or close various circuits defined by the segments 128, 132, and 136 to alter the current state of each shape-memory transducer and thereby effect relative movement between adjacent segments.

Figure 2:
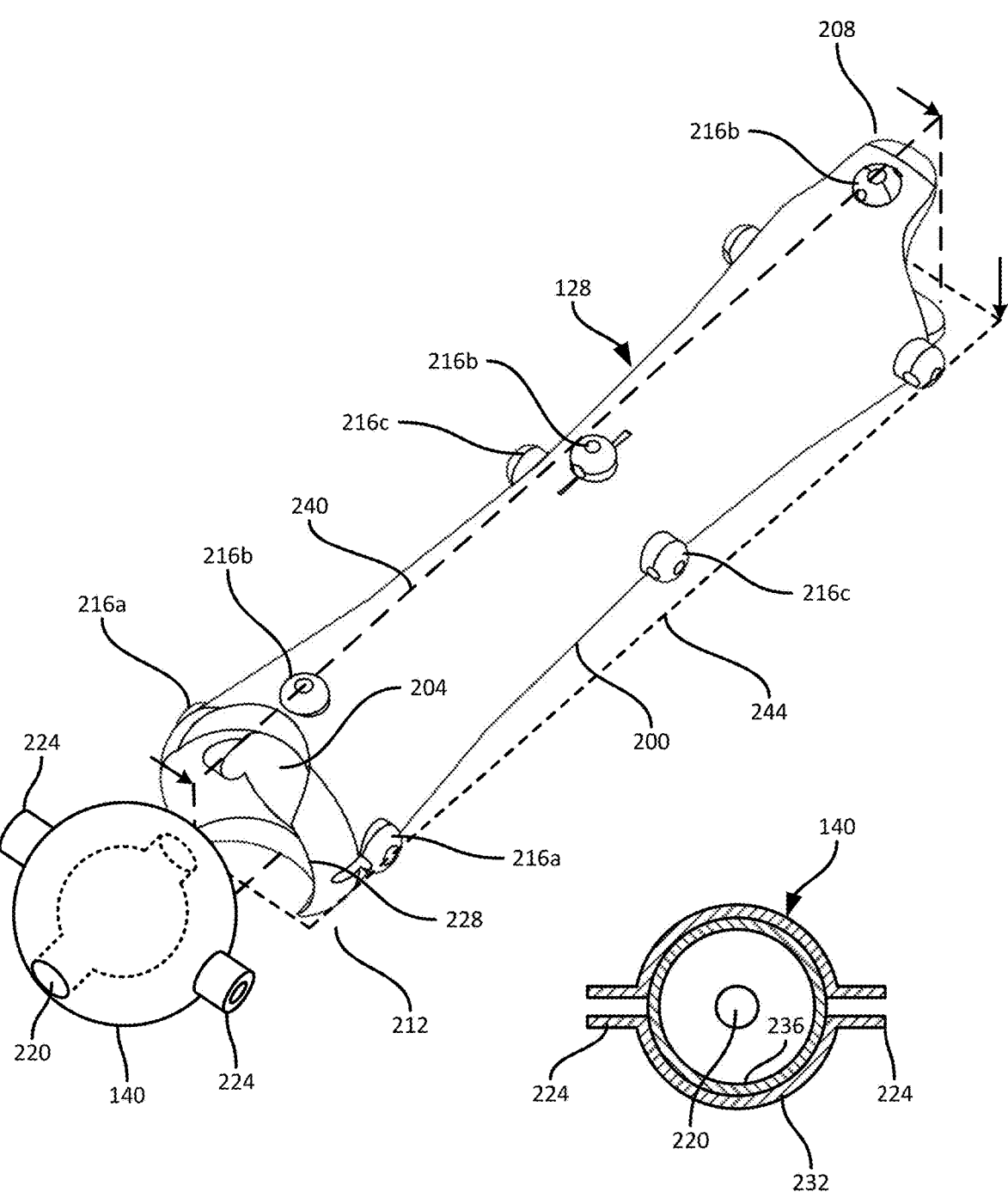
FIG. 2 is a perspective view of a segment of the effector assembly of FIG. 1, and a cross-sectional view of a ball joint of the assembly of FIG. 1.

Turning to FIG. 2, the segment 128 and the joint 140, implemented in this example as a ball joint, are shown isolated from the assembly 100. The segments 132 and 136 share certain structural features with the segment 128. The segment 132, for example, may include the same structural features as discussed below in conjunction with the segment 128, although the segment 132 may have a reduced length between proximal and distal ends in comparison with the segment 128.

The segment 128 includes, as shown in FIG. 2, a generally cylindrical wall 200 defining a conduit (e.g., a hollow channel) 204 extending between a proximal end 208 of the segment 128 and a distal end 212 of the segment 128. The ends 208 and 212 are open, such that the conduit 204 is in communication with the exterior of the segment 128 at either end. The segment 128 also includes a plurality of anchors 216a, 216b, and 216c extending from an outer surface of the wall 200. Certain anchors 216 connect mechanical linkage components (e.g., rods, wires, cables, or the like) between the segment 128 and an adjacent segment (e.g., the segment 132), enabling shape-memory transducers in the segment 128 to move the adjacent segment 132. The linkage components are not shown in FIG. 2 for clarity of illustration. Certain anchors 216 can also receive electrical signal lines, such as conductive wires or the like, for controlling the shape-memory transducers.

In the present example, the anchors 216a can receive a distal end of a mechanical linkage, for moving the segment 128 (e.g., from a proximal segment or from the base mentioned earlier). The anchors 216b can be configured to movably couple mechanical linkage components to the segment 128, e.g., permitting the linkage components to slide in response to movement of the shape-memory transducers. The anchors 216c can connect to the electrical subassembly 116, e.g., to selectively ground the wall 200. The wall 200, or at least an inner surface thereof, can be conductive, and the anchors 216c can be electrically connected to the inner surface.

FIG. 2 also illustrates an example ball joint 140, including a channel 220 extending therethrough to permit air flow through the segment 128 when the ball joint 140 (and, in some examples, additional segments) is connected at the distal end 212 of the segment 128. Each ball joint 140, 144, 148 of the assembly 100 includes a channel 220, such that the conduits defined through each segment 128, 132, and 136 are in fluid communication and a vacuum applied by the vacuum source 112 is communicated to the outlet 124. The ball joint further includes axial protrusions 224. As seen in FIG. 2, the protrusions 224 abut a proximal edge 228 of the segment 128 when the ball joint 140 is installed, restricting the range of motion of the segment 128 about the ball joint 140 to rotation in a single plane containing the conduit (e.g., perpendicular to the protrusions 224).

FIG. 2 also illustrates the ball joint 140 in cross section. As seen in the cross-sectional view, the ball joint 140 includes a non-conductive outer shell 232 (e.g., Teflon™ or the like), and a conductive core 236, e.g., of aluminum, a carbon-fiber based composite, or the like. The protrusions 224 can be open to expose the conductive core 236, enabling electrical signals to be applied to the conductive core 236. As discussed below, the conductive core 236 is connected to the shape-memory transducers, which are electrically activated, and application of electrical signals to the ball joint 140 can therefore control one or more shape-memory transducers.

Figure 3A:
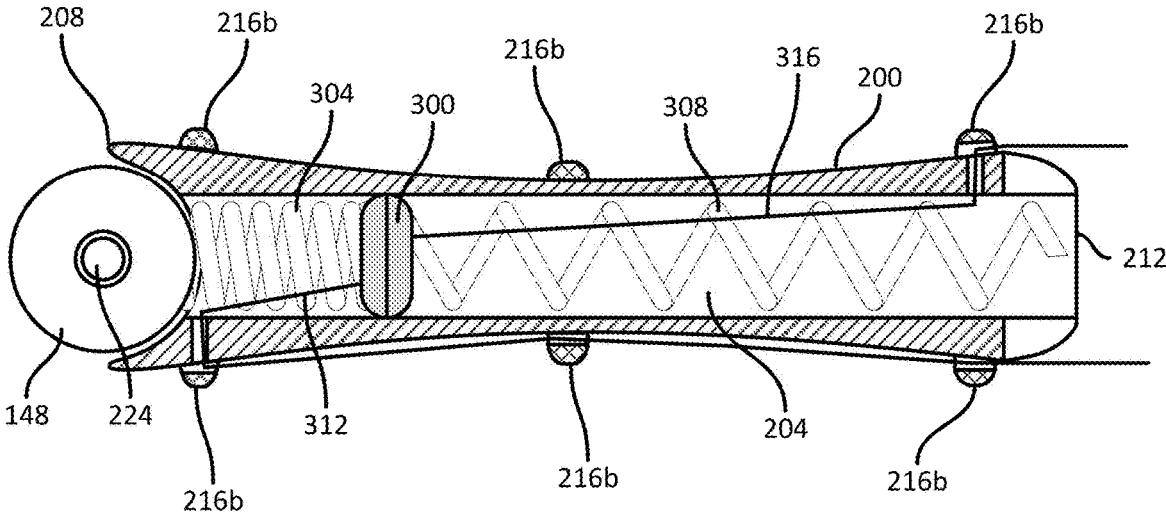
FIG. 3A is a first cross-sectional view of the segment of FIG. 2.
Figure 3B:
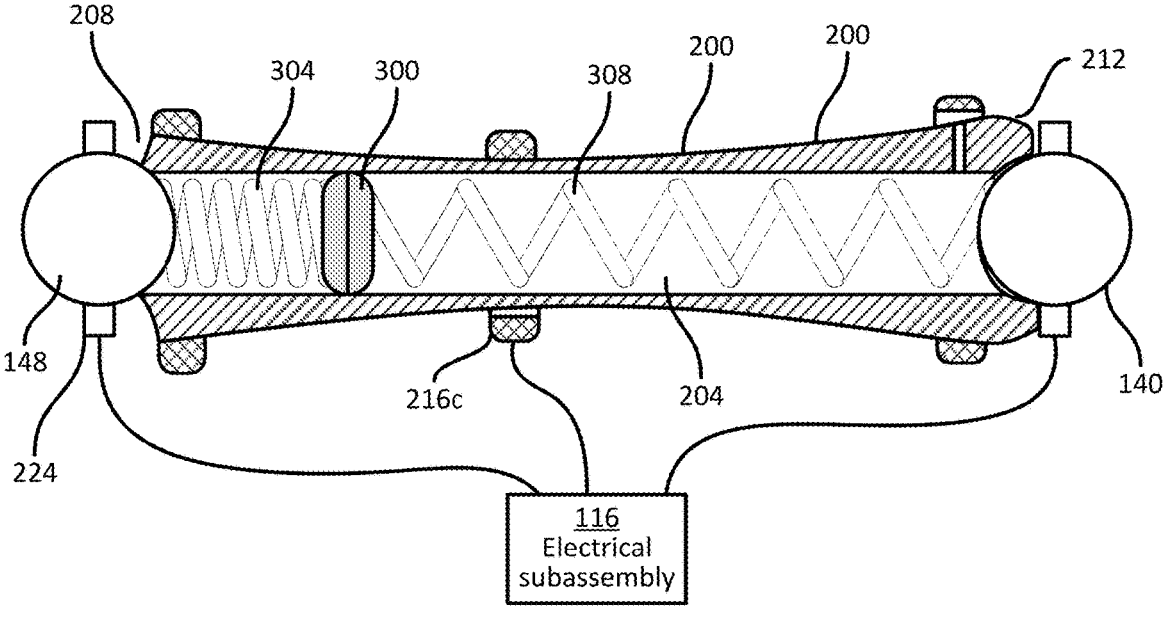
FIG. 3B is a second cross-sectional view of the segment of FIG. 2.

FIG. 3A illustrates a first cross-sectional view taken at the plane 240 shown in FIG. 2, and FIG. 3B illustrates a second cross-section view taken at the plane 244 shown in FIG. 2. The cross-sectional views of FIGS. 3A and 3B illustrate various components of the assembly 100 disposed within the segment 128. The conduit 204 houses an output member 300 slidable within the conduit 204, e.g., to place the output member 300 at varying distances from the proximal end 208 and the distal end 212. The output member 300 can be disc-shaped or toroidal, and contacts the inner surface of the wall 200. Further, at least an outer surface of the output member 300 is electrically conductive.

The conduit 204 also houses a first shape-memory transducer 304, affixed between the proximal end 208 and the output member 300, and a second shape-memory transducer 308, affixed between the output member 300 and the distal end 212. The shape-memory transducers 304 and 308 are fabricated from a shape-memory material such as a nickel-titanium alloy, or the like. In the present example, each transducer 304, 308 includes a helical coil of a nickel-titanium alloy, which may be coated with a flexible non-conductive polymer or other non-conductive coating.

The transducers 304 and 308 have shape-memory, in that each transducer has a memory state, to which the transducer returns in response to an environmental stimulus, such as being heated to a threshold temperature. The temperature at which a transducer returns to the memory state can be tuned via selection of the specific alloy used for the transducer. Each transducer 304, 308 can therefore be plastically deformed into a deformed state, and remain in the deformed state until application of a suitable stimulus causes the transducer to return to the memory state. In the present example, the transducer 304 is shown in a deformed state, in which the coil is compressed relative to the memory state of the transducer 304. The transducer 308 is shown in the memory state. In this example, the transducers 304 and 308 have the same physical configuration in the memory state, but in other examples the transducers 304 and 308 may have different memory states from one another.

In the illustrated example, energizing the transducer 304 in the deformed state causes the transducer 304 to forcefully expand towards the memory state. In other examples, the deformed and memory states can be reversed, e.g., such that the transducer 304 is in the memory state, and the transducer 308 is in the deformed state. In such examples, energizing the transducer 308 in the deformed state causes the transducer 308 to forcefully contract towards the memory state.

Each transducer is connected physically and electrically at one end to a ball joint (e.g., the ball joint 148 for the transducer 304, and the ball joint 140 for the transducer 308). Specifically, for example, one end of the transducer can be inserted into the channel 220 of the corresponding ball joint, to engage with the conductive core 236. Further, the opposing end of each transducer is connected physically and electrically to the output member 300. The transducers 304 and 308 are isolated from one another by the output member 300. For example, the output member 300 can include two conductive portions joined by an isolator.

The assembly 100 also includes a mechanical linkage between the output member 300 and an adjacent segment. As shown in FIG. 3A, the linkage includes a first line 312 (e.g., one or more rods, cables, wires, or the like) extending from the output member 300 to an adjacent segment (e.g., the segment 132) via an anchor 216b between the output member 300 and the proximal end 208. In other words, the line 312 extends from the output member 300 to an anchor 216b adjacent to the proximal end 208, and then travels towards the distal end 212 for connecting with the next distal segment.

The linkage also includes, in this example, a second line 316 extending from the output member 300 to the adjacent segment via another anchor 216b between the output member 300 and the distal end 212. The second line 316 travels in generally the same direction throughout its course, as opposed to the first line 312. The lines 312 and 316 extend in opposite directions from the output member 300, before travelling in a common direction to the adjacent segment (e.g., the segment 132). Movement of the output member 300 in either direction within the conduit 204 therefore applies opposing forces on the lines 312 and 316. For example, movement of the output member 300 towards the distal end 212 exerts tension on the first line 312, and releases tension on the second line 316. Movement of the output member 300 towards the proximal end 208 releases tension on the first line 312, and exerts tension on the second line 316. As discussed below, varying tension applied by the lines 312 and 316 causes the adjacent segment 132 to rotate relative to the segment 128.

Movement of the output member 300 is controlled by the application of electrical signals to the transducers 304 and 308. As shown in FIG. 3B, the assembly 100 includes electrical connections (e.g., conductive wires or the like) from the electrical subassembly 116 to the ball joint 148, the ball joint 140, and an anchor 216c. The electrical subassembly 116 can include a bank of switches or other control circuitry, configured to apply a control voltage to either or both of the ball joints 148 and 140. The electrical subassembly can further open or close a ground circuit connected with the anchor 216c, to complete or break a circuit travelling from either or both of the ball joints 140 and 148, through either or both of the transducers 304 and 308, and to the anchor 216c.

For example, when the electrical subsystem 116 applies a signal to the ball joint 148, and completes the ground circuit connected to the anchor 216c, current flows from the conductive core 236 of the ball joint 148, through the transducer 304 to the output member 300, from the output member 300 to the inner surface of the wall 200, and returns to the electrical subassembly 116 via the anchor 216c. The current increases the temperature of the transducer 304, and when the transducer 304 reaches a threshold temperature, the transducer 304 expands to a memory state, moving the output member 300 towards the distal end 212 and compressing the transducer 308 out of a memory state and into a deformed state. The movement of the output member 300 applies or releases tension on the lines 312 and 316 as noted above.

As a further example, application of a signal to the ball joint 140, with the ground connection closed causes current to flow through the transducer 308, biasing the transducer 308 to the memory state and shifting the output member 300 back towards the proximal end 208, as well as deforming the transducer 304. Movement of the output member 300 applies or releases tension on the lines 312 and 316 in a configuration opposite to that applied by movement of the output member 300 towards the distal end 212.

Cooling of the transducers 304 and 308 can be achieved by the application of a vacuum to the conduit 204 from the vacuum source 112. The flow of air through the conduit 204, in other words, can accelerate cooling of the transducers 304 and 308 after an activation, facilitating deformation of the transducers 304 and 308.

Figure 4:
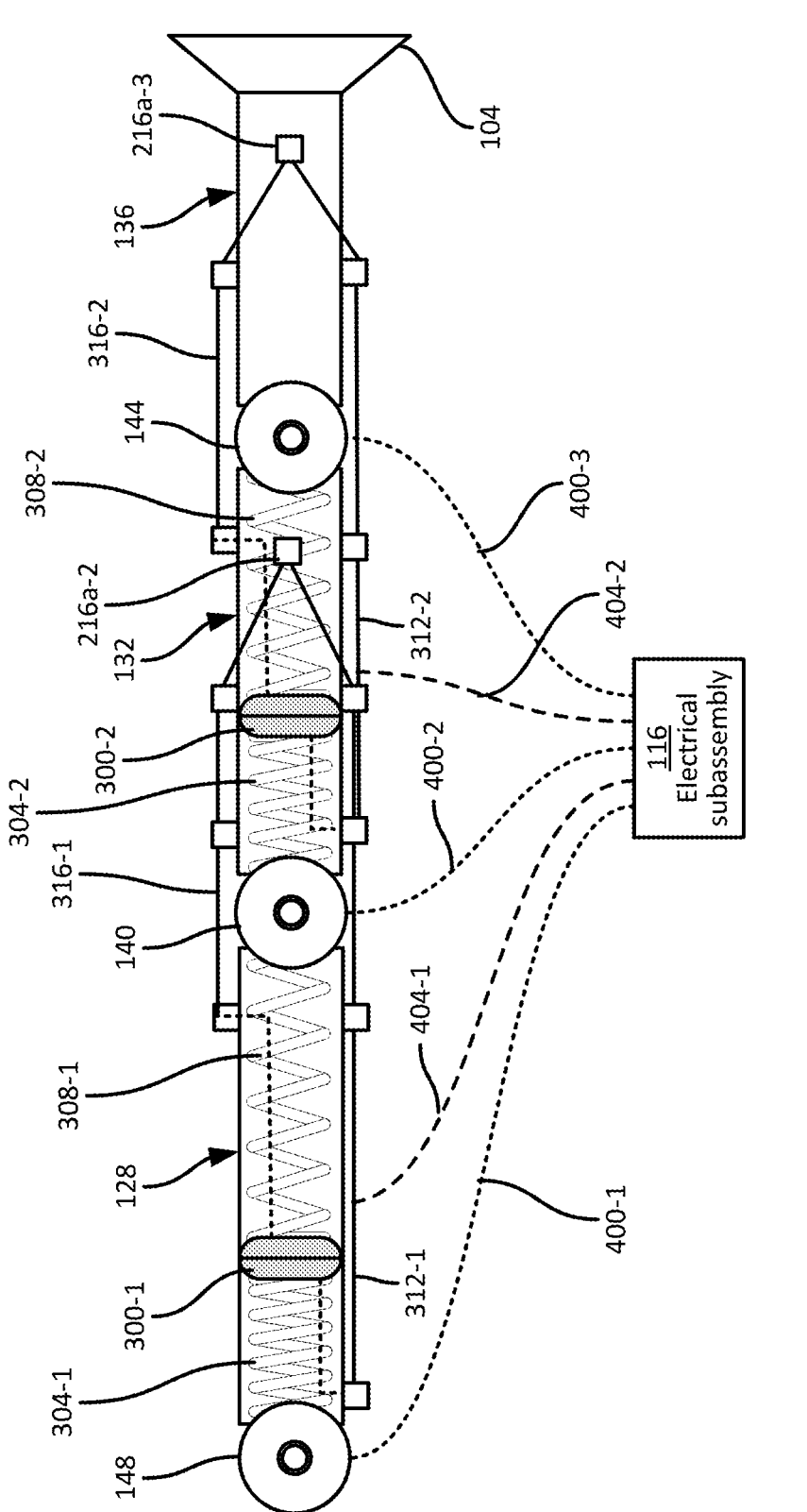
FIG. 4 is a simplified view of the assembly of FIG. 1 in a first operational configuration.

Turning to FIG. 4, a simplified representation of the assembly 100 is illustrated, showing electrical connections 400-1, 400-2, and 400-3 from the electrical subassembly 116 to the ball joints 148, 140, and 144 respectively. FIG. 4 also illustrates a ground connection 404-1 from the segment 128 to the electrical subassembly 116 (the anchor 216c is omitted for clarity), and a ground connection 404-2 from the segment 132 to the electrical subassembly 116. Various other components of the assembly 100 are also shown, with suffixes introduced according to which of the segments 128, 132, and 136 the components are housed in or on. That is, the segment 128 houses an output member 300-1, transducers 304-1 and 308-1, and linkage lines 312-1 and 316-1. The segment 132 houses an output member 300-2, transducers 304-2 and 308-2, and linkage lines 312-2 and 316-2. Further, selected anchors 216 are labelled, including an anchor 216a-2 on the segment 132, and an anchor 216a-3 on the segment 136.

In response to one or more commands from the controller 120, the electrical subassembly 116 can close a switch connected with the ground connection 404-1, to ground the segment 128, as well as apply an electrical signal to the ball joint 148 via the electrical connection 400-1. Electrical current therefore flows from the electrical subassembly 116, through the transducer 304-1, and back to the electrical subassembly 116 via the output member 300-1.

Figure 5:
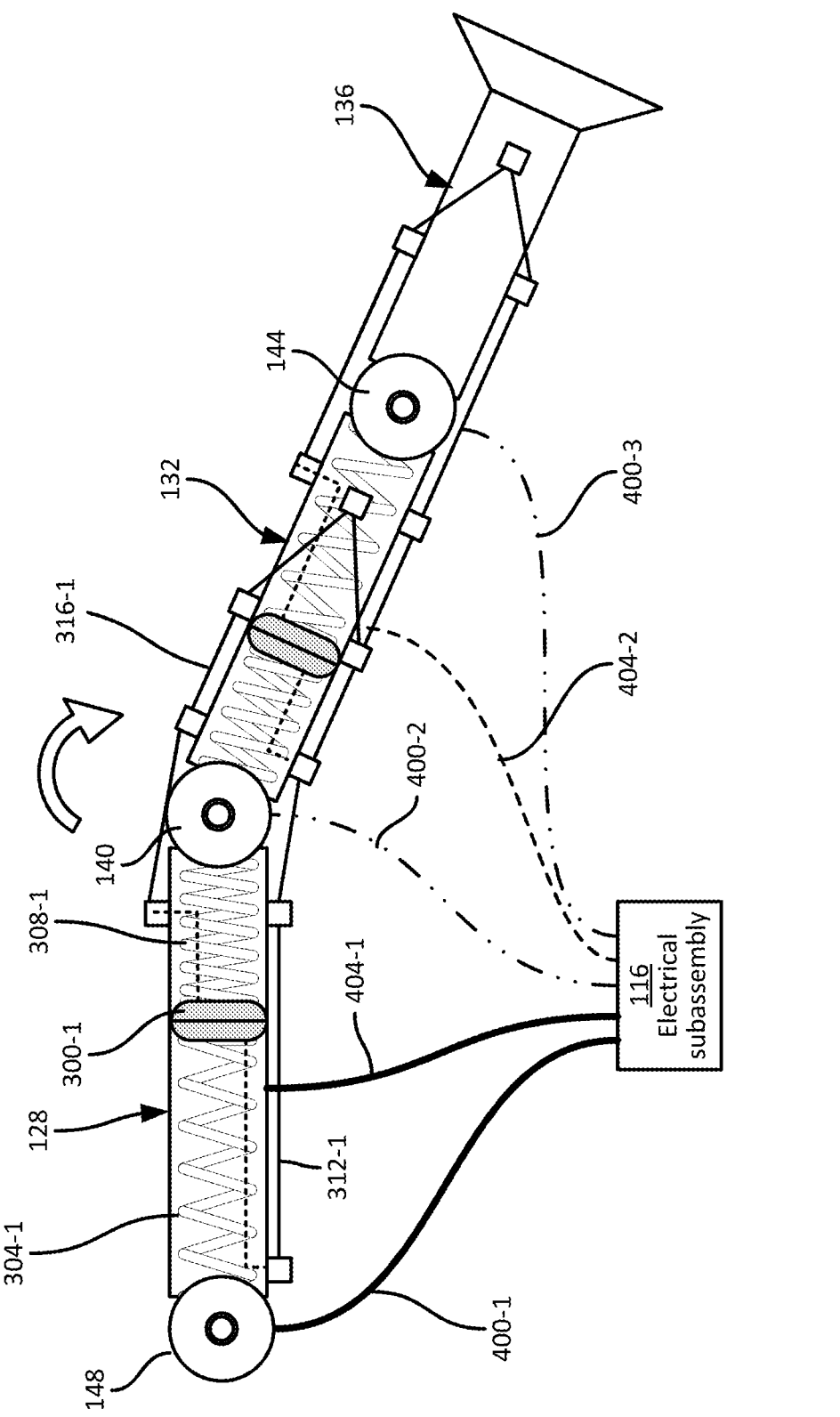
FIG. 5 is a simplified view of the assembly of FIG. 1 in a second operational configuration.

As shown in FIG. 5, in response to the above electrical signal, the transducer 304-1 is biased to the memory state, moving the output member 300-1 towards the segment 132 and deforming the transducer 308-1. Further, the output member 300-1 applies tension to the line 312-1 and releases tension on the line 316-1, causing the segment 132 to rotate about the ball joint 140. As will be apparent, by selectively applying signals to the connections 400 and opening or closing the ground connections 404, the electrical subassembly 116 can cause bi-directional rotation of each of the segments 132 and 136, e.g., to engage with an object to be manipulated.

The lines 312 and 316, and the connections 400 and 404 can be coupled to the segments via a dielectric sleeve or other coating, e.g., to reduce the risk of tangling or catching on nearby objects. Further, such a sleeve can serve to retain the segments against the respective ball joints.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An effector assembly, comprising:
a first segment defining a first conduit between (i) a first proximal end having an inlet, and (ii) a first distal end having an outlet;
an output member slidable within the conduit;

a first shape-memory transducer affixed between the first proximal end and the output member;
a second shape-memory transducer affixed between the first distal end and the output member;
an electrical subassembly configured to selectively supply current to (i) bias the first shape-memory transducer to a first memory state and bias the second shape-memory transducer to a second deformed state, for sliding the output member in a first direction, or (ii) bias the second shape-memory transducer to a second memory state and bias the first shape-memory transducer to a first deformed state, for sliding the output member in a second direction;
a second segment movably coupled to the first distal end; and
a linkage between the output member and the second segment, the linkage configured to move the second segment relative to the first segment in response to sliding of the output member.

2. The effector assembly of claim 1, further comprising:
a vacuum source configured to apply a vacuum to the inlet;
wherein the second segment defines a second conduit in communication with the first conduit and terminating at a distal effector outlet for applying the vacuum to a target object.

3. The effector assembly of claim 2, wherein the second segment includes a suction cup defining the distal effector outlet.

4. The effector assembly of claim 1, wherein the second segment defines a second conduit between a second proximal end and a second distal end; and
wherein the effector assembly further comprises:
a second output member slidable within the second conduit;
a third shape-memory transducer affixed between the second proximal end and the second output member; and
a fourth shape-memory transducer affixed between the second distal end and the and output member;
wherein the electrical subassembly is further configured to selectively supply current to (i) bias the third shape-memory transducer to a third memory state and bias the fourth shape-memory transducer to a fourth deformed state, for sliding the second output member in the first direction, or (ii) bias the fourth shape-memory transducer to a fourth memory state and bias the third shape-memory transducer to a third deformed state, for sliding the and output member in the second direction.

5. The effector assembly of claim 4, further comprising:
a third segment movably coupled to the second distal end; and
a linkage between the second output member and the third segment, the linkage configured to move the third segment relative to the second segment in response to sliding of the second output member.

6. The effector assembly of claim 1, wherein the output member electrically isolates the first shape-memory transducer from the second shape-memory transducer, and includes a conductive outer surface; and
wherein an inner surface of the first segment is conductive.

7. The effector assembly of claim 6, further comprising:
a first electrical connection at the first proximal end for applying a current to the first shape-memory transducer;

a second electrical connection at the first distal end for applying a current to the second shape-memory transducer; and a ground connection to the conductive inner surface of the first segment, between the first proximal end and the first distal end.

8. The effector assembly of claim 7, wherein the electrical subassembly includes a plurality of switches configured to enable or disable each of the first electrical connection, the second electrical connection, and the ground connection.

9. The effector assembly of claim 8, further comprising: a controller configured to control the plurality of switches.

10. The effector assembly of claim 7, further comprising:

a ball joint between the first segment and the second segment, the ball joint including a non-conductive shell engaging the first distal end and the second segment, and a conductive core engaging the second shape-memory transducer.

11. The effector assembly of claim 10, wherein the ball joint defines a further conduit therethrough, in communication with the conduit of the first segment.

12. The effector assembly of claim 1, further comprising: a non-conductive coating on the first shape-memory transducer and the second shape-memory transducer.

13. The effector assembly of claim 1, wherein the linkage includes: a first line extending from the output member to the second segment via a first anchor between the output member and the first proximal end.

14. The effector assembly of claim 13, wherein the linkage further includes: a second line extending from the output member to the second segment via a second anchor between the output member and the first distal end.

15. The effector assembly of claim 14, wherein the first line is coupled to a first side of the second segment, and wherein the second line is coupled to a second side of the second segment.

* * * * *